(12) United States Patent
Moreton et al.

(10) Patent No.: US 8,482,567 B1
(45) Date of Patent: Jul. 9, 2013

(54) LINE RASTERIZATION TECHNIQUES

(75) Inventors: Henry Packard Moreton, Woodside, CA (US); Franklin C. Crow, Portola Valley, CA (US)

(73) Assignee: Nvidia Corporation, Santa Clara, CA (US)

( * ) Notice: Subject to any disclaimer, the term of this patent is extended or adjusted under 35 U.S.C. 154(b) by 863 days.

(21) Appl. No.: 11/592,801

(22) Filed: Nov. 3, 2006

(51) Int. Cl.
*G06T 11/20* (2006.01)

(52) U.S. Cl.
USPC .......................................... 345/443; 345/426

(58) Field of Classification Search
USPC ......................................................... 345/443
See application file for complete search history.

(56) References Cited

U.S. PATENT DOCUMENTS

| | | | |
|---|---|---|---|
| 4,208,810 A | 6/1980 | Rohner et al. | |
| 4,918,626 A | 4/1990 | Watkins et al. | |
| 5,081,594 A | 1/1992 | Horsley | |
| 5,287,438 A * | 2/1994 | Kelleher | 345/613 |
| 5,313,287 A | 5/1994 | Barton | |
| 5,432,898 A * | 7/1995 | Curb et al. | 345/443 |
| 5,446,836 A * | 8/1995 | Lentz et al. | 345/441 |
| 5,452,104 A | 9/1995 | Lee | |
| 5,452,412 A | 9/1995 | Johnson, Jr. et al. | |
| 5,483,258 A * | 1/1996 | Cornett et al. | 345/622 |
| 5,543,935 A | 8/1996 | Harrington | |
| 5,570,463 A * | 10/1996 | Dao | 345/443 |
| 5,594,854 A * | 1/1997 | Baldwin et al. | 345/441 |
| 5,623,692 A | 4/1997 | Priem et al. | |
| 5,633,297 A | 5/1997 | Valko et al. | |
| 5,664,162 A | 9/1997 | Dye | |
| 5,815,162 A * | 9/1998 | Levine | 345/443 |
| 5,854,631 A | 12/1998 | Akeley et al. | |
| 5,854,637 A | 12/1998 | Sturges | |
| 5,872,902 A * | 2/1999 | Kuchkuda et al. | 345/615 |
| 5,977,987 A | 11/1999 | Duluk, Jr. | |
| 6,028,608 A | 2/2000 | Jenkins | |
| 6,034,699 A * | 3/2000 | Wong et al. | 345/441 |
| 6,038,348 A * | 3/2000 | Carley | 382/268 |
| 6,072,500 A | 6/2000 | Foran et al. | |
| 6,104,407 A | 8/2000 | Aleksic et al. | |
| 6,104,417 A | 8/2000 | Nielsen et al. | |
| 6,115,049 A | 9/2000 | Winner et al. | |
| 6,118,394 A | 9/2000 | Onaya | |
| 6,128,000 A | 10/2000 | Jouppi et al. | |
| 6,137,918 A | 10/2000 | Harrington et al. | |
| 6,160,557 A | 12/2000 | Narayanaswami | |
| 6,160,559 A | 12/2000 | Omtzigt | |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

Blythe, OpenGL section 3.4.1, Basic Line Segment Rasterization, Mar. 29, 1997, pp. 1-3.*

(Continued)

*Primary Examiner* — M Good Johnson

(57) ABSTRACT

A line rasterization technique in accordance with one embodiment includes conditioning a line by pulling in the ending vertex of the line or pushing out the starting vertex of the line. Thereafter, if the line exits a diamond test area of each pixel that it touches, the pixel may be lit.

20 Claims, 18 Drawing Sheets

U.S. PATENT DOCUMENTS

| | | |
|---|---|---|
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 * | 11/2001 | Gossett .................. 345/619 |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 * | 8/2002 | Baltaretu et al. .......... 345/423 |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,671,000 B1 | 12/2003 | Cloutier |
| 6,693,637 B2 * | 2/2004 | Koneru et al. ............. 345/501 |
| 6,693,639 B2 | 2/2004 | Duluk, Jr. et al. |
| 6,697,063 B1 | 2/2004 | Zhu |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 * | 9/2004 | Thrasher .................. 345/443 |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,978,317 B2 * | 12/2005 | Anantha et al. ............. 709/249 |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,061,495 B1 | 6/2006 | Leather |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 * | 10/2006 | Fowler et al. ............. 345/421 |
| 7,154,066 B2 | 12/2006 | Talwar et al. |
| 7,158,148 B2 | 1/2007 | Toji et al. |
| 7,170,515 B1 | 1/2007 | Zhu |
| 7,184,040 B1 | 2/2007 | Tzvetkov |
| 7,224,364 B1 * | 5/2007 | Yue et al. ................. 345/468 |
| 7,307,628 B1 * | 12/2007 | Goodman et al. .......... 345/421 |
| 7,307,638 B2 | 12/2007 | Leather et al. |
| 7,362,325 B2 * | 4/2008 | Anderson .................. 345/419 |
| 7,382,368 B1 | 6/2008 | Molnar et al. |
| 7,414,636 B2 * | 8/2008 | Kokojima et al. .......... 345/622 |
| 7,453,466 B2 | 11/2008 | Hux et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,633,506 B1 | 12/2009 | Leather et al. |
| 7,634,637 B1 | 12/2009 | Lindholm et al. |
| 7,791,617 B2 | 9/2010 | Crow et al. |
| 7,965,902 B1 | 6/2011 | Zelinka et al. |
| 8,063,903 B2 | 11/2011 | Vignon et al. |
| 8,144,166 B2 * | 3/2012 | Lyapunov et al. .......... 345/611 |
| 2001/0005209 A1 | 6/2001 | Lindholm et al. |
| 2002/0050979 A1 | 5/2002 | Oberoi et al. |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0067468 A1 | 4/2003 | Duluk, Jr. et al. |
| 2003/0076325 A1 * | 4/2003 | Thrasher .................. 345/443 |
| 2003/0122815 A1 | 7/2003 | Deering |
| 2003/0163589 A1 | 8/2003 | Bunce et al. |
| 2003/0194116 A1 | 10/2003 | Wong et al. |
| 2003/0201994 A1 | 10/2003 | Taylor et al. |
| 2004/0085313 A1 | 5/2004 | Moreton et al. |
| 2004/0130552 A1 | 7/2004 | Duluk, Jr. et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0259100 A1 | 11/2005 | Teruyama |
| 2005/0275663 A1 * | 12/2005 | Kokojima et al. .......... 345/622 |
| 2006/0033745 A1 * | 2/2006 | Koselj et al. .............. 345/519 |
| 2006/0044317 A1 | 3/2006 | Bourd et al. |
| 2006/0132495 A1 * | 6/2006 | Anderson .................. 345/581 |
| 2006/0170690 A1 | 8/2006 | Leather |
| 2006/0203005 A1 | 9/2006 | Hunter |
| 2006/0245001 A1 | 11/2006 | Lee et al. |
| 2006/0267981 A1 | 11/2006 | Naoi |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0198163 A1 * | 8/2008 | Nakahashi et al. .......... 345/443 |
| 2008/0273218 A1 | 11/2008 | Kitora et al. |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

Boyer, et al.; "Discrete Analysis for Antialiased Lines," Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

A hardware assisted design rule check architecture Larry Seiler Jan. 1982 Proceedings of the 19th conference on design automation DAC '82 Publisher: IEEE Press.

A parallel algorithm for polygon rasterization Juan Pineda Jun. 1988 ACM.

A VLSI architecture for updating raster-scan displays Satish Gupta, Robert F. Sproull, Ivan E. Sutherland Aug. 1981 ACM SIGGRAPH Computer Graphics, Proceedings of the 8th annual conference on Computer graphics and interactive techniques SIGGRAPH '81, vol. 15 Issue 3 Publisher: ACM Press.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grant MCS 76-83889; pp. 1-5.

* cited by examiner

```
static bool DiamondExitAdj(NVFloatSlope px1,
                           NVFloatSlope py1,
                           NVFloatSlope px2,
                           NVFloatSlope py2,
                           bool line_positive_major,
                           bool *pushout_lineStart,
                                           // this means move the 1st vertex over so the pixel is lit
                           bool *pullin_lineEnd,
                                           // this means move the 2nd vertex over so it is NOT lit
                           bool x_major)
{ double x1 = px1.ToDouble();
                                           // convert to double for convenience
    double y1 = py1.ToDouble();
    double x2 = px2.ToDouble();
    double y2 = py2.ToDouble();
    bool cull = false;
    bool shortLine;
                                           // both x or y -coords in same pixel
```

Figure 7A

```
double max = ((double)0x3fffff)/256;
                                                    // screen max * 2 - 8 lsbs
double min = -16384;
                                                    // screen max * 2 if (x1 > max) x1 = max;
if (x1 < min) x1 = min;
if (y1 > max) y1 = max;
if (y1 < min) y1 = min;
if (x2 > max) x2 = max;
if (x2 < min) x2 = min;
if (y2 > max) y2 = max;
if (y2 < min) y2 = min;

double x1frac = x1 - floor(x1);
double y1frac = y1 - floor(y1);
double x2frac = x2 - floor(x2);
double y2frac = y2 - floor(y2);
if (!x1frac) x1frac = 1.0;
if (!y1frac) y1frac = 1.0;
if (!x2frac) x2frac = 1.0;
if (!y2frac) y2frac = 1.0;
```

Figure 7B

```
if (x_major) {
   shortLine = (x1 - x1frac) == (x2 - x2frac);
} else {
   shortLine = (y1 - y1frac) == (y2 - y2frac);
} double x1t = x1frac - 0.5;
                                              // get Manhattan distance from pixel center
double y1t = y1frac - 0.5;
                                              // move to -0.5 to 0.5
double x2t = x2frac - 0.5;
double y2t = y2frac - 0.5;

bool inDiamond1, inDiamond2;

inDiamond1 = (fabs(x1t) + fabs(y1t)) < 0.5;
inDiamond2 = (fabs(x2t) + fabs(y2t)) < 0.5;

bool touchesQuadIII1 = (y1t - x1t == 0.5) && (x1t >= -0.5 && x1t <= 0.0 && y1t >= 0.0 && y1t <= 0.5);
bool touchesQuadIV1  = (x1t + y1t == 0.5) && (x1t >= 0.0 && x1t <= 0.5 && y1t >= 0.0 && y1t <= 0.5);
```

Figure 7C

```
bool touchesQuadIII2 = (y2t - x2t == 0.5) && (x2t >= -0.5 && x2t <= 0.0 && y2t >= 0.0
&& y2t <= 0.5);

bool touchesQuadIV2 = (x2t + y2t == 0.5) && (x2t >= 0.0 && x2t <= 0.5 && y2t >=
0.0 && y2t <= 0.5);

bool touchesPointA1 = (x1t == 0.5 && y1t == 0.0);
bool touchesPointC1 = (x1t == -0.5 && y1t == 0.0);

bool touchesPointA2 = (x2t == 0.5 && y2t == 0.0);
bool touchesPointC2 = (x2t == -0.5 && y2t == 0.0);

if (x_major) {
    inDiamond1 |= (touchesQuadIII1 || touchesQuadIV1) && !touchesPointA1 &&
!touchesPointC1;
    inDiamond2 |= (touchesQuadIII2 || touchesQuadIV2) && !touchesPointA2 &&
!touchesPointC2;
} else {
    inDiamond1 |= (touchesQuadIII1 || touchesQuadIV1) && !touchesPointC1;
    inDiamond2 |= (touchesQuadIII2 || touchesQuadIV2) && !touchesPointC2;
} if (shortLine && inDiamond1 && inDiamond2) cull = true;
                                                // make sure eensy lines are culled
```

Figure 7D

```
if (x_major) {
  if (line_positive_major) {
                                                                // right-going line
    if (x2frac >= 0.5) {
            // p2 (end point) in right half-pixel (trailing edge, won't cover ctr unless > 0.5)
      if (inDiamond2) {
                                        // p2 in diamond, not exiting - don't draw pixel
        if (shortLine) cull = true;
                                        // both endpoints in the same pixel, cull
      else *pullin_lineEnd = true;
                // multipixel line, not exiting diamond, pull back to miss pixel ctr.
    }
  }
  if (x1frac >= 0.5) {
                                        // p1 (start point) in right half-pixel missing center
    if (inDiamond1 && !(shortLine && inDiamond2))
                                // exiting damond (starts in diamond, p2 outside diamond)
      *pushout_lineStart = true;
                                        // adjust out (to left) to catch pxl ctr.
  }
}
```

Figure 7E

```
        else {
                                                            // left-going line
            if (x2frac <= 0.5) {
                                // p2 (end point) in left half-pixel (leading edge, so strictly < 0.5)
                if (inDiamond2) {
                                            // p2 in diamond, not exiting - don't draw pixel
                    if (shortLine) cull = true;
    // both endpoints in the same pixel, cull
                    else *pullin_lineEnd = true;
                                // multipixel line, not exiting diamond, pull back to miss pixel ctr.
            }
        }
        if (x1frac <= 0.5) {
                                // start_line in left half-pixel (must be <= since it's a trailing edge)
            if (inDiamond1 && !(shortLine && inDiamond2))
                                // exiting damond (starts in diamond, p2 outside diamond)
                *pushout_lineStart = true;
                                            // adjust out (to right) to catch pxl ctr.
        }
    }
```

Figure 7F

```
} else if (line_positive_major) {
                                                // down-going line
    if (y2frac >= 0.5) {
            // p2 (end point) in bottom half-pixel (trailing edge, won't cover ctr unless > 0.5)
        if (inDiamond2) {
                        // p2 in diamond, not exiting - don't draw pixel
            if (shortLine) cull = true;
                                // both endpoints in the same pixel, cull
            else *pullin_lineEnd = true;
                        // multipixel line, not exiting diamond, pull back to miss pixel ctr.
        }
    }
    if (y1frac >= 0.5) {
                        // p1 (start point) in bottom half-pixel missing center
        if (inDiamond1 && !(shortLine && inDiamond2))
                        // exiting diamond (starts in diamond, p2 outside diamond)
            *pushout_lineStart = true;
                                // adjust out (to up) to catch pxl ctr.
    }
```

Figure 7G

```
        } else {
                                    // up-going line                          // left-going
            if (y2frac <= 0.5) {
                                    // p2 (end point) in top half-pixel (leading edge, so strictly < 0.5)
                if (inDiamond2) {
                                    // p2 in diamond, not exiting - don't draw pixel
                    if (shortLine) cull = true;
                                    // both endpoints in the same pixel, cull
                    else *pullin_lineEnd = true;
                                    // multipixel line, not exiting diamond, pull back to miss pixel ctr.
                }
            }
            if (y1frac <= 0.5) {
                                    // start_line in top half-pixel (must be <= since it's a trailing edge)
                if (inDiamond1 && !(shortLine && inDiamond2))
                                    // exiting damond (starts in diamond, p2 outside diamond)
                    *pushout_lineStart = true;
                                    // adjust out (to down) to catch pxl ctr.
            }
        }
        return(cull);
    }
```

Figure 7H

LINE RASTERIZATION TECHNIQUES

BACKGROUND OF THE INVENTION

Three-dimensional graphics processing is utilized in a number of applications, from electronic games, and movies to computer aided design (CAD). Conventionally, three-dimensional graphics processing includes a multi-step rendering process of transitioning from a database representation of three-dimensional objects to a two-dimensional projection of the object into a display space. The process generally includes setting up a polygon model (e.g., a plurality of primitives) of objects, applying linear transformation to each primitive, culling back facing primitives, clipping the primitives against a view volume, rasterizing the primitives to a pixel coordinate set, shading/lighting the individual pixels using interpolated or incremental shading techniques, and the like.

In the conventional art, aliased lines may be drawn differently depending upon the particular computer hardware. For example, when drawing a line strip, one or more pixels located at the end of one segment and the beginning of the next segment may be missed or may be lit twice. In another example, a line may be shifted in one direction with respect to the same line drawn by a different computer system. However, as computing device continue to progress it is desirable to rasterize lines so that they are drawn the same across various configurations of computer hardware.

SUMMARY OF THE INVENTION

Embodiments of the present invention are directed toward techniques for rasterizing lines. In one embodiment, a method of rasterizing lines includes receiving the starting and ending vertices of a given line. The starting and/or ending vertices may be conditioned. Thereafter, the pixels in which the line exits a diamond test area may be lighted.

In another embodiment, a computer-readable medium containing a plurality of instructions which when executed cause a computing device to implement a method of conditioning a line is disclosed. The method of conditioning the line includes pulling in an ending vertex of a given line if the ending vertex is in a given portion of a pixel, the ending vertex is in a second diamond test area but does not exit and both vertices of the given line are not in the same pixel. The method also includes pushing out a starting vertex if the starting vertex is in the given portion of the pixel and the given line exits a first diamond test area. The method may further include culling the given line if the ending vertex is in a given portion of the pixel, the ending vertex is in the second diamond test area but does not exit and both vertices of the given line are in the same pixel. If the given line is a short line and the given line is in the first diamond test area and the second diamond test area, wherein the given line is a short line if the corresponding coordinates of the starting and ending vertices are in the same pixel, the method may also cull the line.

In yet another embodiment, a processor includes a setup unit, a rasterizer communicatively coupled to the setup unit, and a data write unit communicatively coupled to the rasterizer. The setup unit receives drawing commands and parameters describing one or more geometric primitives, such as lines, polygons or the like. The rasterizer converts the geometric primitives into pixel data. The rasterizer includes line conditioner for pulling in an ending vertex of a given line if it is a given type, the ending vertex is in a given portion of a pixel, the ending vertex is in a second diamond test area but does not exit and both vertices of the given line are not in the same pixel. The line conditioner also pushes out the starting vertex of the given line if it is a given type, the starting vertex is in the given portion of the pixel and the given line exits a first diamond test area. The data write unit outputs the resulting pixel data after the conditioned lines have been converted to pixel data.

BRIEF DESCRIPTION OF THE DRAWINGS

Embodiments of the present invention are illustrated by way of example and not by way of limitation, in the figures of the accompanying drawings and in which like reference numerals refer to similar elements and in which:

FIGS. 7A-7H show an exemplary set of software instructions for implementing a method of conditioning a line, in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
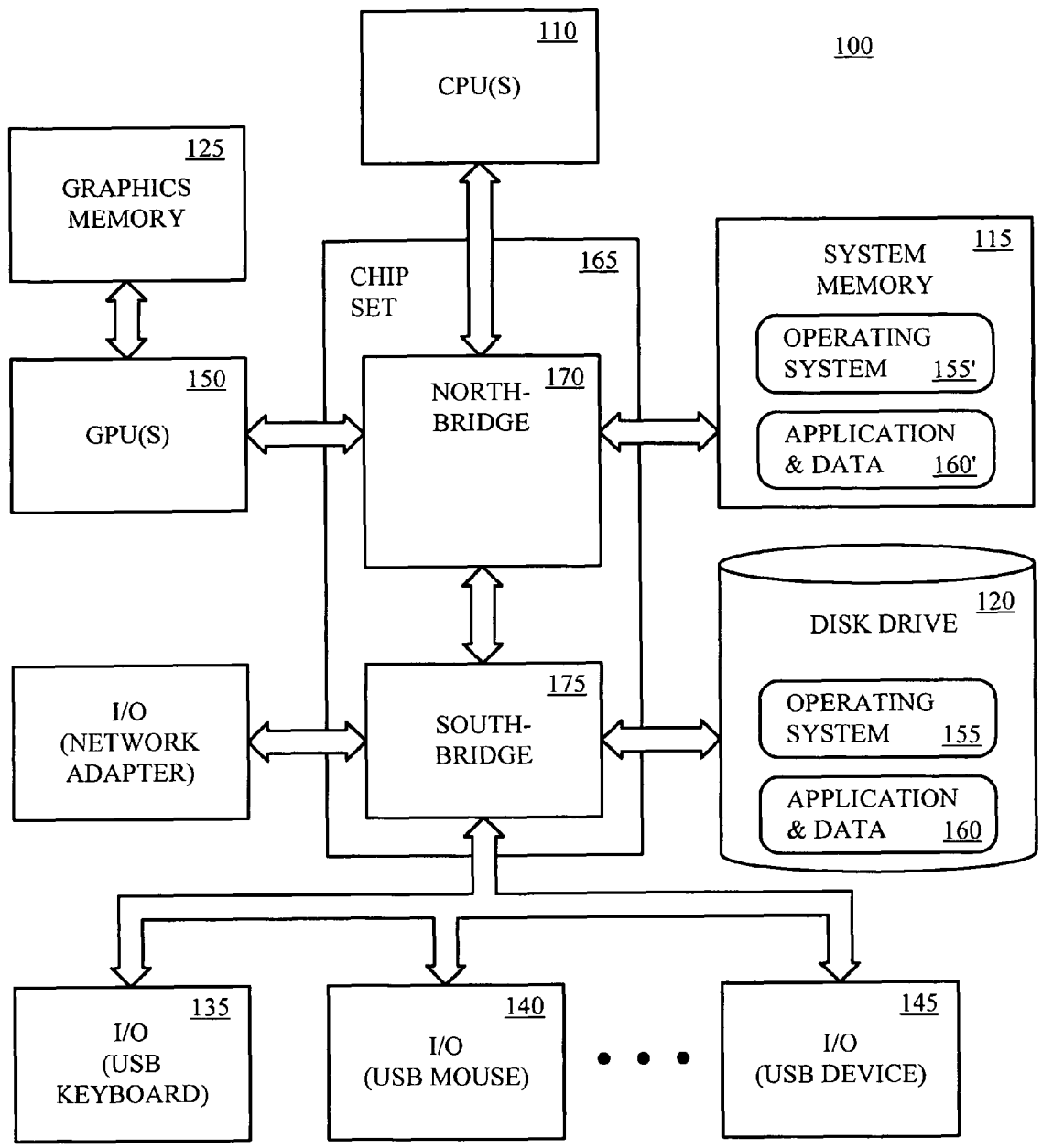
FIG. 1 shows a block diagram of an exemplary computing device for implementing embodiments of the present invention.

Referring to FIG. 1, an exemplary computing device 100 for implementing embodiments of the present invention is shown. The computing device 100 may be a personal computer, laptop computer, hand-held device, game console, personal entertainment center, media center PC, tablet PC, computer based simulator, server computer, client computer, minicomputer, mainframe computer, distributed computer system or the like. The computing device 100 includes one or more general purpose processors (e.g., CPU) 110, one or more computing device-readable media 115, 120, 125 and one or more input/output (I/O) devices 120, 130, 135, 140, 145. The I/O device 130, 125, 140, 145 may include a network adapter (e.g., Ethernet card), CD drive, DVD drive and/or the like, and peripherals such as a keyboard, a pointing device, a speaker, a printer, and/or the like. The computing device 100 may also include one or more specialized processors, such as a graphics processing unit (GPU) 150.

The computing device-readable media 115, 120, 125 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 155 and applications and data 160. The primary memory, such as the system memory 115 and/or graphics memory 125, provides for volatile storage of computer-readable instructions and data for use by the computing device 100. For instance, the system memory 115 may temporarily store a portion of the operating system 155' and a portion of one or more applications and associated data 160' that are currently used by the CPU 110, GPU 150 and the like.

The computing device-readable media 115, 120, 125, I/O devices 120, 130, 135, 140, 145, and GPU 150 may be communicatively coupled to the processor 110 by a chip set 165 and one or more busses. The chipset 165 acts as a simple input/output hub for communicating data and instructions between the processor 110 and the computing device-readable media 115, 120, 125, I/O devices 120, 130, 135, 140, 145, and GPU 150. In one implementation, the chipset 165 includes a northbridge 170 and southbridge 175.

One or more of the processors 110, 150 implements a rasterization technique when rendering graphical data. In one implementation, images are off-loaded from the general purpose CPU 110 to the graphics processor 150 by transferring geometric primitive parameters, draw commands and instruction for controlling the operation of the GPU 150. The geometric primitives may be vertex data representations of lines, triangulated three dimensional models of objects and the like. The geometric primitives, draw commands and instructions are transferred from the CPU 110 to the GPU 150 utilizing a graphics application programming interface, such as the OpenGL-ES™ graphics language, Direct3D™, or the like. In response the GPU 150 generates a color and depth value for each pixel to be displayed. In another implementation, the GPU 150 may be an integral part of the CPU 110.

One or more processors 110, 150, in accordance with embodiments of the present invention, implement a concise and efficient implementation of well-defined rasterization rules. The rasterization rules utilize line conditioning in combination with a diamond exit technique as described in more detail below.

Figure 2:
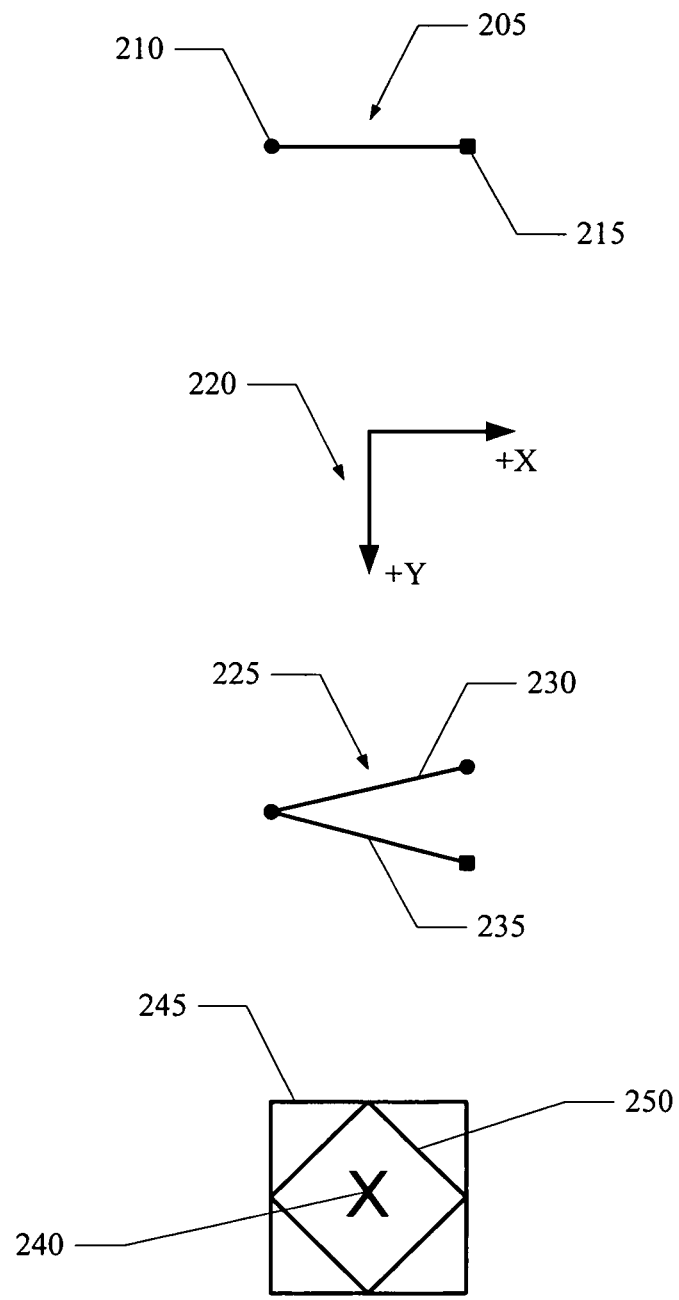
FIG. 2 shows some concepts for understanding the resterization techniques, in accordance with embodiments of the present invention.

Referring now to FIG. 2, some concepts for understanding the resterization techniques, in accordance with embodiments of the present invention, are illustrated. In particular, a line 205 may be specified by a starting vertex 210 and an ending vertex 215. The line 205 may be drawn relative to an x-y-coordinate system 220. A complex line is a line strip 225 composed of a plurality of segments 230, 235. Accordingly, line strips 225 are drawn no differently than the equivalent sequences of independent lines in the same direction.

A graphical surface of an image and a display device may be divided into a plurality of pixels. The center 240 of each pixel 245 may be denoted by an "X." In addition, the pixel may be logically divided into four quadrants in accordance with the conventional x-y-coordinate system. When determining whether a pixel 245 is lit or not, a diamond test area 250 may be utilized to test whether a given line is within the pixel 245 or not. The corners of the diamond test area may, for ease of understanding the present invention, be labeled as corners A, B, C and D starting at the top and proceeding in a clockwise direction around the perimeter of the diamond test area.

Figure 3A:
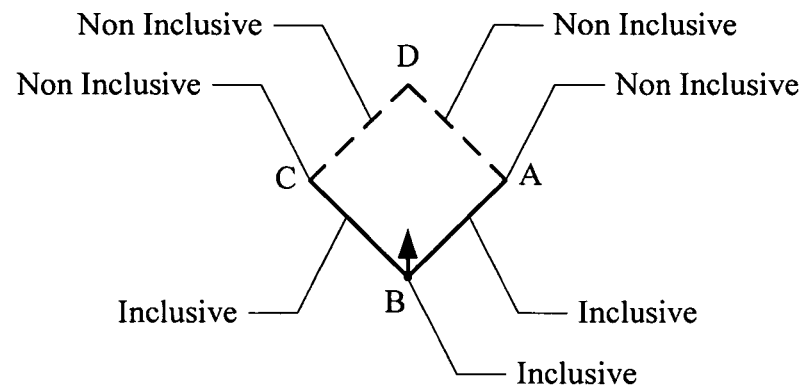
FIGS. 3A and 3B show an x-major and a y-major diamond test area, in accordance with one embodiment of the present invention.
Figure 3B:
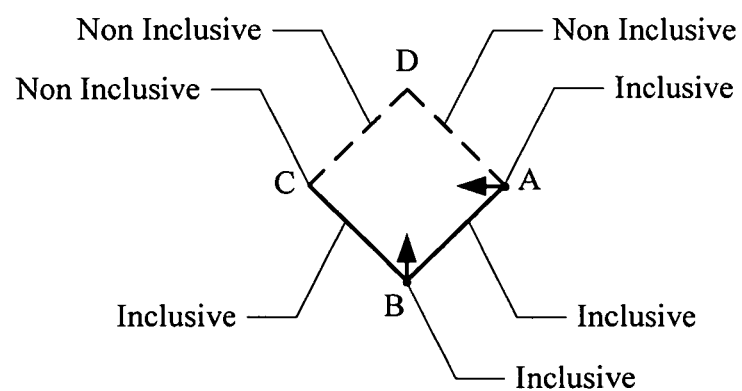

Referring now to FIGS. 3A and 3B, an x-major and a y-major diamond test area, in accordance with one embodiment of the present invention, are shown. An x-major line is a line that has a slope of greater than or equal to −1 and less than or equal to 1, and a y-major line is a line that has any other slope. As depicted in FIG. 3A, the diamond test area for an x-major line includes that area within the diamond, the lower left edge, the lower right edge and the bottom corner of the diamond. The diamond test area for an x-major line, however, excludes the upper left and upper right edges, and the left, top and right corners. As depicted in FIG. 3B, the diamond test area for a y-major line includes that area within the diamond, the lower left edge, the lower right edge, the bottom corner and the right corner of the diamond. The diamond test area for the y-major line, however, excludes the upper left and upper right edges, and the left and top corners.

Figure 4:
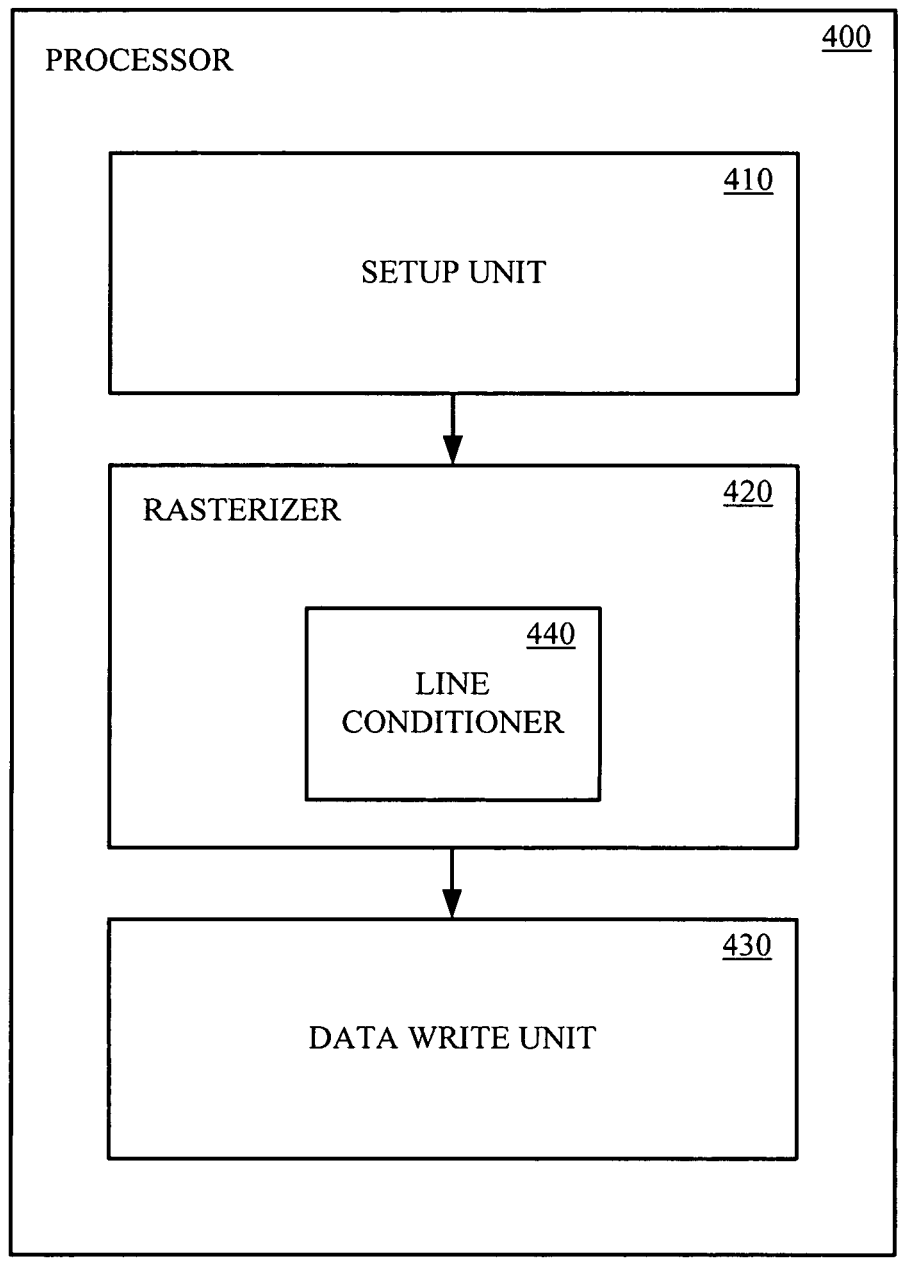
FIG. 4 shows a block diagram of a processor, in accordance with one embodiment of the present invention.

Referring now to FIG. 4, a processor, in accordance with one embodiment of the present invention, is shown. The processor 400 may be a graphics processing unit (GPU) 150, a central processing unit (CPU) 110, or the like. The processor 400 includes a setup unit 410, a rasterizer 420 and a data write unit 430. The rasterizer 420 is communicatively coupled to the setup unit 410 and the data write unit 430 is communicatively coupled to the rasterizer 420. The processor 400 may also include a gatekeeper unit, a data fetch unit, a microshader, vertex buffer, a scoreboard, a fetch cache, write buffer and/or the like. The units of the processor 400 are typically arranged in a pipeline architecture.

Figure 5:
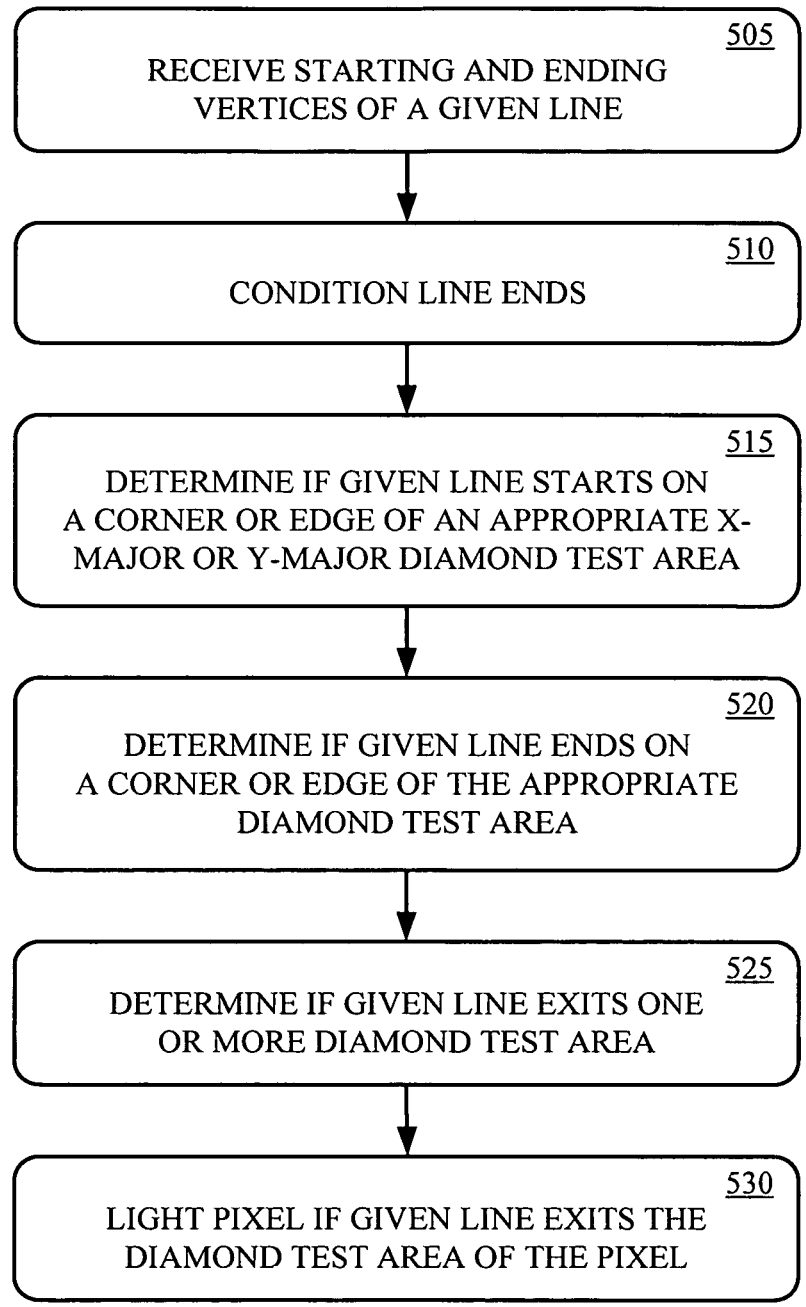
FIG. 5 shows a flow diagram of a method of rasterizing lines, in accordance with one embodiment of the present invention.
Figure 6A:
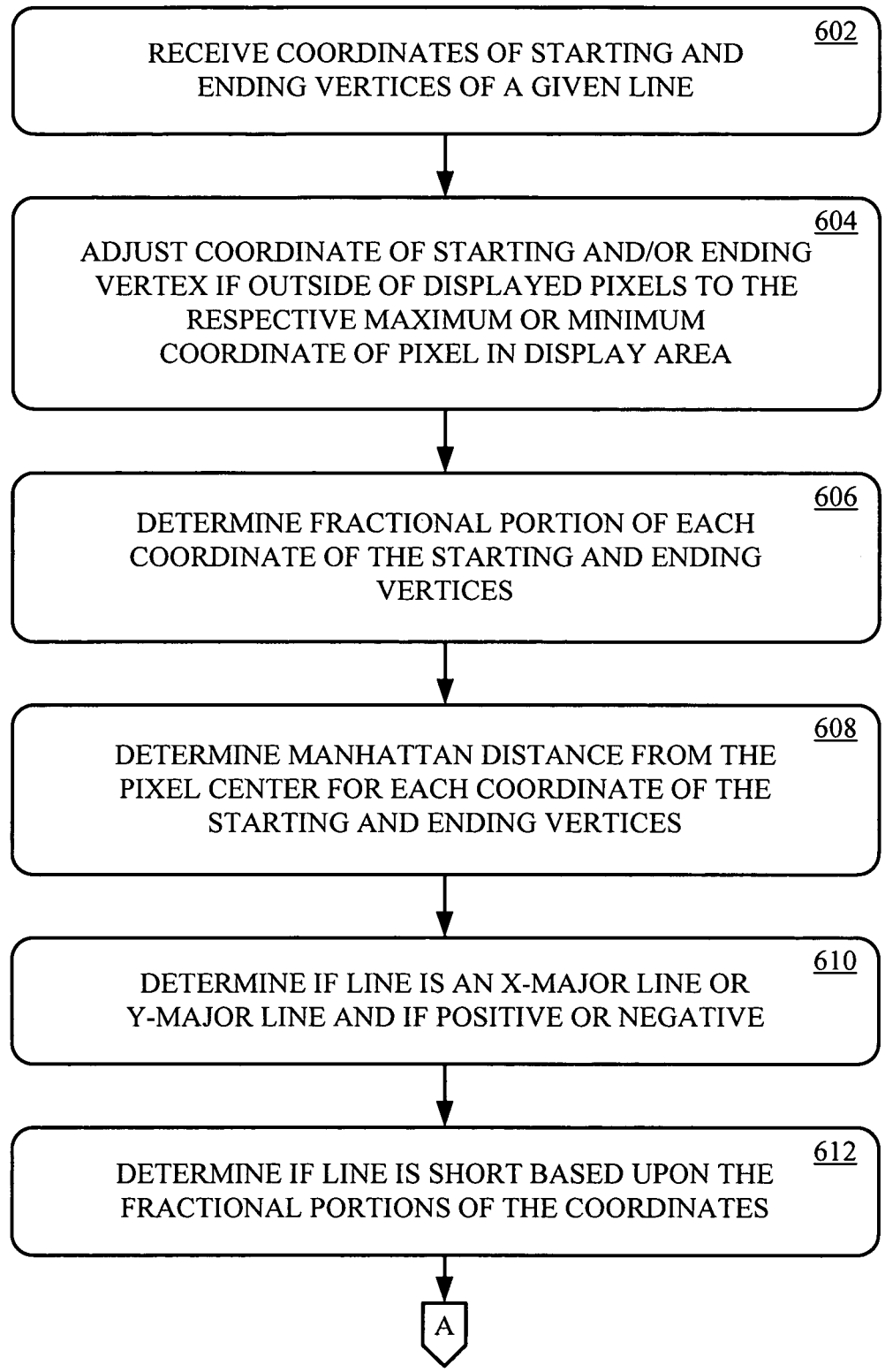
FIGS. 6A-ˆ6E show a flow diagram of a method of conditioning a line, in accordance with one embodiment of the present invention.
Figure 6B:
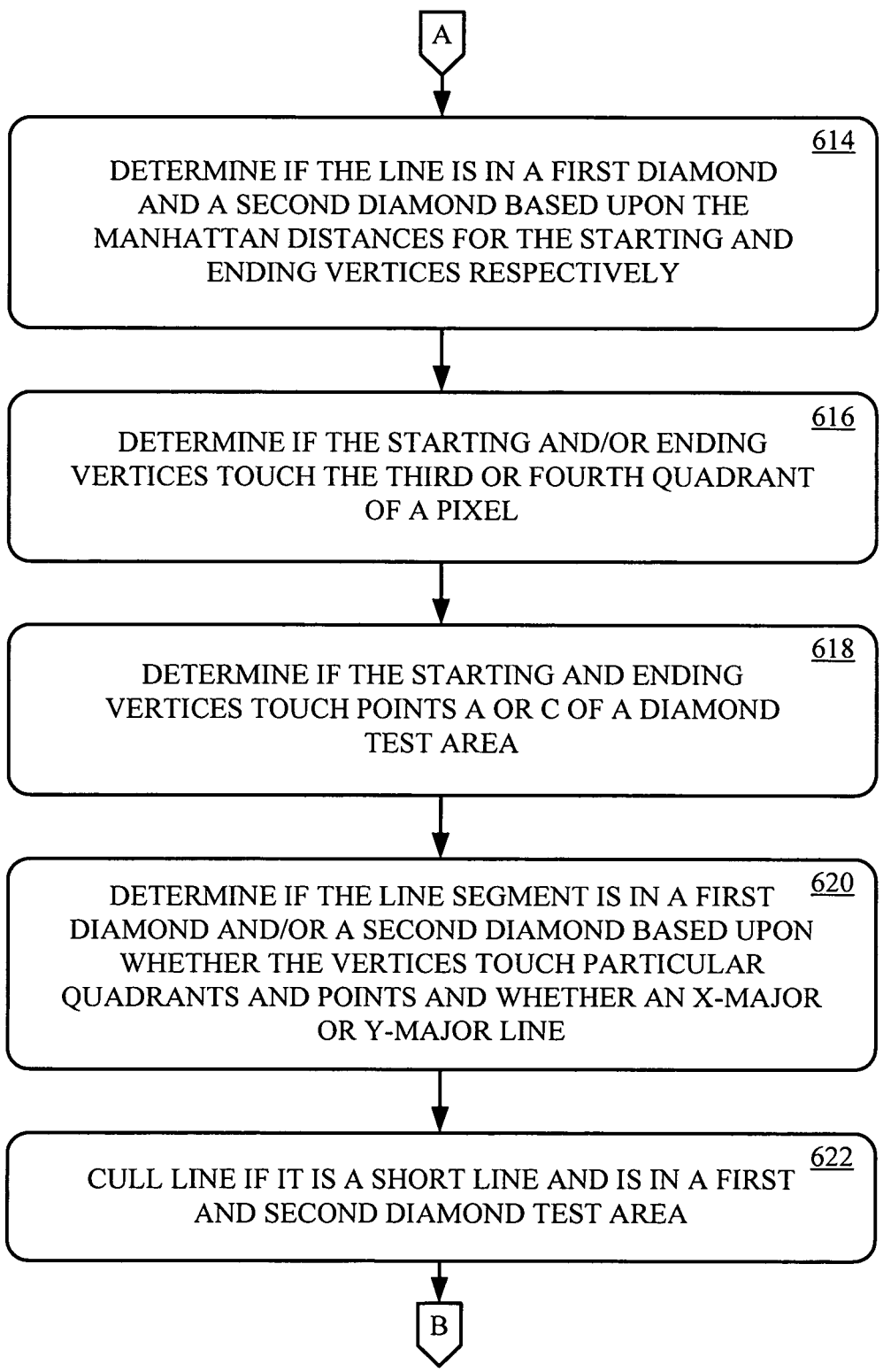
Figure 6C:
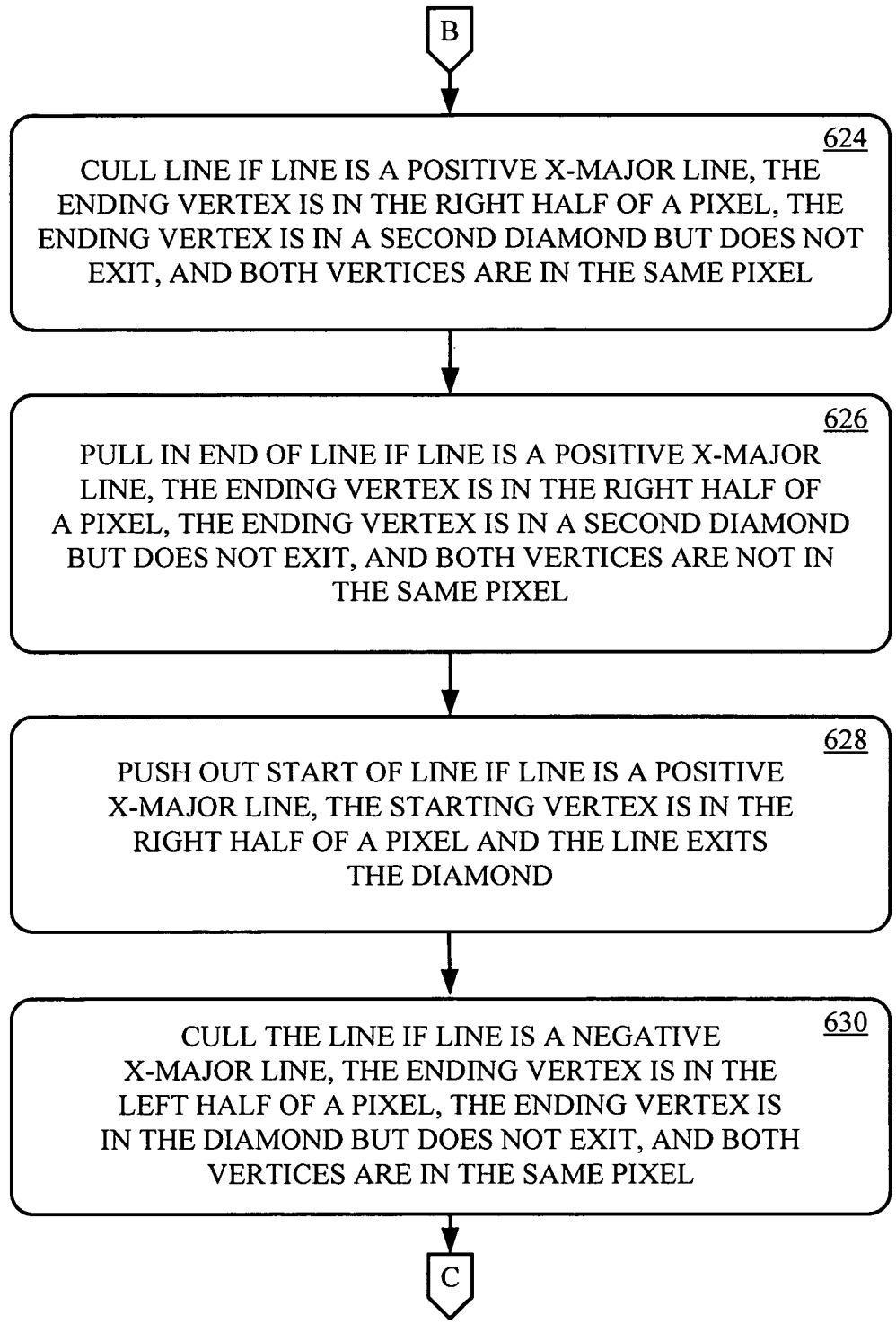
Figure 6D:
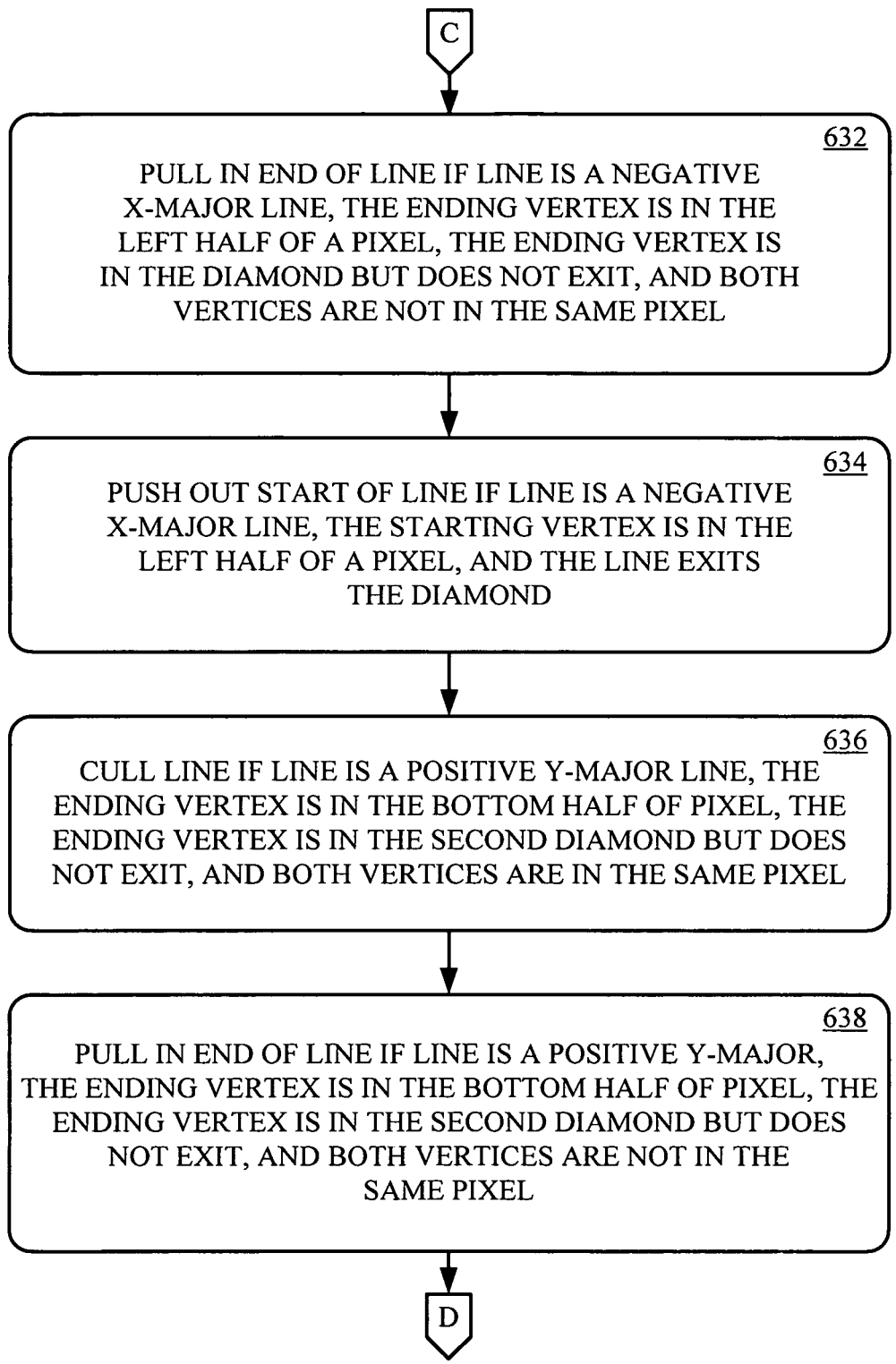
Figure 6E:
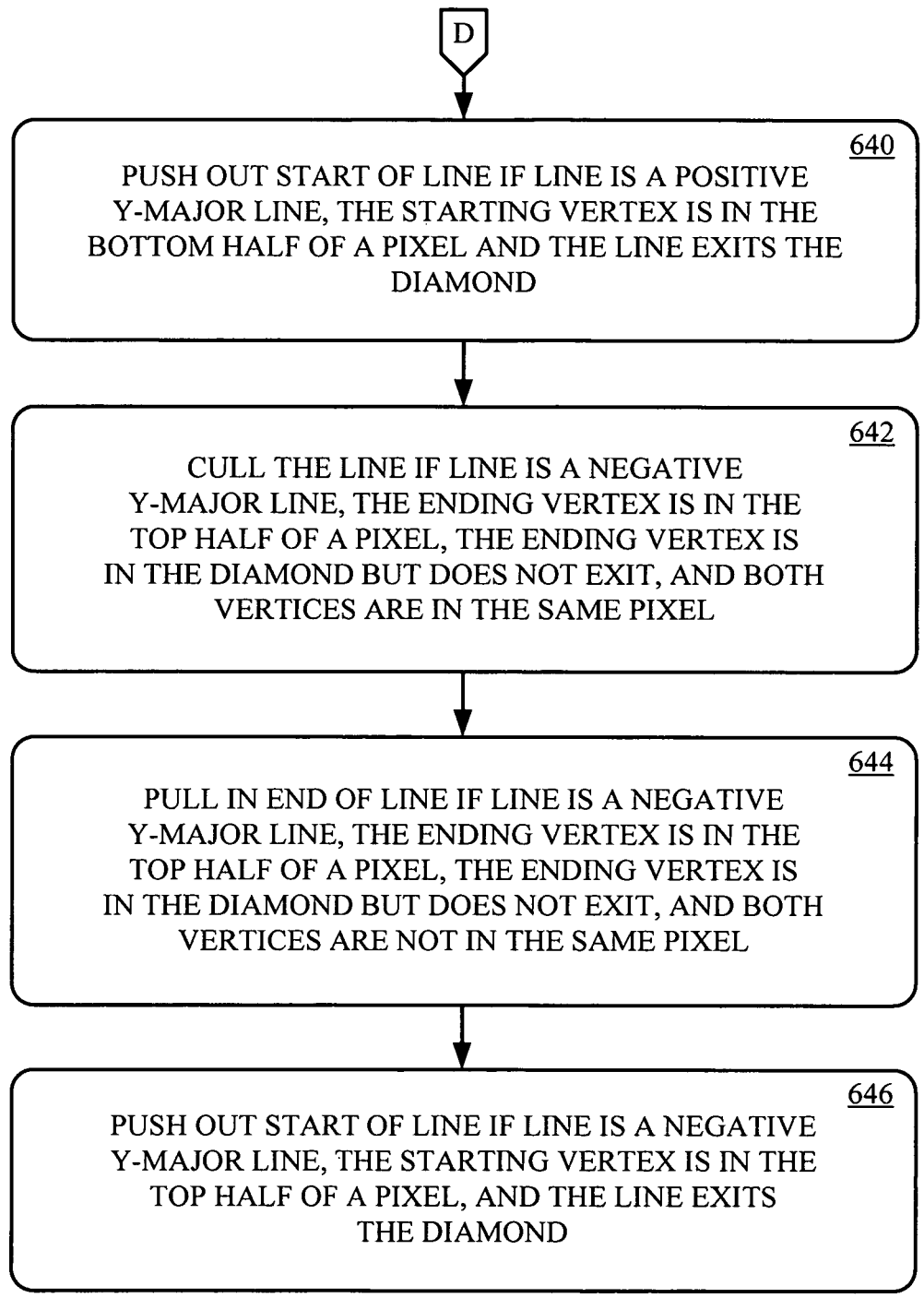

Operation of the processor 400 will be further explained in combination with a method of rasterizing lines as shown in FIG. 5. The setup unit 410 receives geometric primitives, draw command and instructions. The setup unit 410 prepares parameters (e.g., vertex data) of the primitives for resterization. The setup unit 410 may also perform clipping and viewpoint operations, culling of back-facing primitives and occlusion, guard-band clipping, power management for the rest of the pipeline, and/or the like. The rasterizer 420 receives the starting and ending vertices for each line to be drawn from the setup unit 410, at 505.

The rasterizer receives instructions and vertex data and performs rasterization thereupon. Rasterization includes "walking" the primitive and generating pixel packets that contain parameters (e.g., set of descriptions for each pixel). The rasterizer 420 includes line conditioner 440 for conditioning the starting and/or ending vertex of a line, or each segment of a line strip. In one implementation, the line conditioner 440 is implemented in a combination logic circuit. The line conditioner 440 is adapted to push out the start of the line or pull in the end of the line, at 510. In one implementation, the starting vertex of a given line type may be pushed out to catch the center of the pixel if the ending vertex is in a given portion of a pixel, the ending vertex is in a second diamond test area but does not exit and both vertices of the given line are not in the same pixel. The starting vertex of the given line type may be pushed out if the starting vertex is in a given portion of the pixel and the given line exits a first diamond test area. The line of the given type may also be culled if the ending vertex is in the given portion of the pixel, the ending vertex is in the second diamond test area but does not exit and both vertices of the given line are in the same pixel. The line may also be culled if it is a short line and in the first diamond test area and the second diamond test area, wherein the given line is a short line if the corresponding coordinates of the starting and ending vertices are in the same pixel.

The rasterizer 430 is adapted to determine if the line starts on a corner or edge of the appropriate diamond test area for a given pixel, at 515. The appropriate diamond test area is selected depending upon whether the line is an x-major or y-major line. If the line starts on an inclusive edge or corner the line starts in the given diamond test area. If the line starts on a non-inclusive edge or corner the line starts outside the given diamond test area.

The rasterizer 430 is also adapted to determine if the line ends on a corner or edge of the diamond test area, at 520. If the line ends on an inclusive edge or corner the line ends in the given diamond test area. If the line ends on a non-inclusive edge or corner the line the line ends outside the given diamond test area.

The rasterizer 430 is also adapted to determine if the line exits one or more diamond test areas for each pixel that is touched, at 525. A line touches a given pixel if the line exits the pixel's diamond test area, when traveling along the line from the start toward the end. The rasterizer 430 is adapted to light each pixel in which the line exits the diamond test area of the given pixel, at 530. The data write unit 430 outputs the resulting pixel data. In one implementation, the data write unit 430 writes the pixel data to a frame buffer.

Referring now to FIGS. 6A-6E, a method of conditioning a line, in accordance with one embodiment of the present invention, is shown. The method begins with receiving a starting vertex and ending vertex of a given line, at 602. In one implementation, the starting vertex may be specified by a first set of coordinates (X1, Y1) and the ending vertex may be specified by a second set of coordinates (X2, Y2).

At 604, any-coordinate that is outside a maximum and minimum value is adjusted to the respective maximum or minimum value. In particular, any-coordinate of a vertex that is greater than a given maximum is set to the maximum value. Similarly, any-coordinate of a vertex that is less than a given minimum is set to the minimum value.

At 606, the fractional portion of each coordinate of the starting and ending vertices is determined. If there is no fractional portion for a given coordinate, the value of the fractional portion is set to 1.0. At 608, the Manhattan distance from each coordinate to the pixel center is determined for each vertex. In one implementation, the Manhattan distance is calculated by subtracting 0.5 from the fractional portion of each coordinate of each vertex.

At 610, it is determined if the given line is an x-major line or a y-major line and if it has a positive or genitive slope. The line may be an "x-major" line if the slope is greater than or equal to -1 and less than or equal to 1 (e.g., more horizontal than vertical). The line may be a "y-major" line if the slope is less than -1 or greater than 1 (e.g., more vertical than horizontal).

At 612, it is determined if the line is a short line. A line is short if the corresponding coordinates of the starting and ending vertices are in the same pixel. In one implementation, an x-major segment is a short line if the difference between the x-coordinate value of the starting vertex and the fraction portion of the x-coordinate of the starting vertex is equal to the difference between the x-coordinate value of the ending vertex and the fraction portion of the x-coordinate of the ending vertex. For a y-major line, the line segment is a short line if the difference between the y-coordinate value of the starting vertex and the fraction portion of the y-coordinate of the starting vertex is equal to the difference between the y-coordinate value of the ending vertex and the fraction portion of the y-coordinate value of the ending vertex.

At 614, it is determined if the start of the line segment is in a first diamond and if the end of the line segment is in a second diamond based upon the Manhattan distances for the starting and ending vertices respectively. In one implementation, the start of the line segment (e.g., first vertex) is in a first diamond if the sum of the absolute value of the Manhattan distance for the x-coordinate of the starting vertex and the absolute value of the Manhattan distance for the y-coordinate of the starting vertex is less than 0.5. The end of the line segment is in a second diamond if the sum of the absolute value of the Manhattan distance for the x-coordinate of the ending vertex and the absolute value of the Manhattan distance for the y-coordinate of the ending vertex is less than 0.5.

At 616, it is determined if the starting and/or ending vertices touch the third or fourth quadrant of a pixel. In one implementation, the starting vertex touches the third quadrant if the difference between the fractional portions of its y-coordinate and x-coordinate is equal to 0.5, and if the fractional portion of its x-coordinate is greater than or equal to -0.5 and less than or equal to 0.0 and the fractional portion of its y-coordinate is greater than or equal to 0.0 and less than or equal to 0.5. The starting vertex touches the fourth quadrant if the sum or the fractional portions of its y-coordinate and x-coordinate is equal to 0.5, and if the fractional portion of its x-coordinate is greater than or equal to 0.0 and less than or equal to 0.5 and the fractional portion of its y-coordinate is greater than or equal to 0.0 and less than or equal to 0.5. The ending vertex touches the third quadrant if the difference between the fractional portions of its y-coordinate and x-coordinate is equal to 0.5, and if the fractional portion of its x-coordinate is greater than or equal to -0.5 and less than or equal to 0.0 and the fractional portion of its y-coordinate is greater than or equal to 0.0 and less than or equal to 0.5. The ending vertex touches the fourth quadrant if the sum of the fractional portions of its y-coordinate and x-coordinate is equal to 0.5, and if the fractional portion of its x-coordinate is greater than or equal to 0.0 and less than or equal to 0.5 and the fractional portion of its y-coordinate is greater than or equal to 0.0 and less than or equal to 0.5.

At 618, it is determined if the starting and/or ending vertices touch points A or C of a diamond test area. In one implementation, the starting vertex touches point A if the fractional portion of its x-coordinate is equal to 0.5 and the fractional portion of its y-coordinate is equal to 0.0. The starting vertex touches point C if the fractional portion of its x-coordinate is equal to -0.5 and the fractional portion of its y-coordinate is equal to 0.0. The ending vertex touches point A if the fractional portion of its x-coordinate is equal to 0.5 and the fractional portion of its y-coordinate is equal to 0.0. The ending vertex touches point C if the fractional portion of its x-coordinate is equal to -0.5 and the fractional portion of its y-coordinate is equal to 0.0.

At 620, it is determined if the line segment is in a first diamond test area and/or a second diamond test area based upon whether the vertices touch particular quadrants in the pixel and points in the diamond test area. In one implementation, the first vertex of an x-major line is not in the first diamond test area if the first vertex touches the third or fourth quadrants, does not touch point A, and does not touch point C. The second vertex of the x-major line is not in the second diamond test area if the second vertex touches the third or fourth quadrants, does not touch point A, and does not touch point C. For a y-major line, the first vertex is not in the first diamond test area if the first vertex touches the third or fourth quadrants, and does not touch point C. The second vertex of the y-major line is not in the second diamond test area if the second vertex touches the third or fourth quadrants, and does not touch point C.

At 622, the line may be culled if the line is a short line, as determined in process 412, and is in the first and second diamond test areas, as determined in process 620. Such lines may be culled so that very short lines are not drawn.

At 624, if a) the line is a positive (e.g., right-going) x-major line, b) the ending vertex is in a right half of a pixel (e.g., the ending vertex of the line will not cover the center), c) the ending vertex is in a second diamond but does not exit, and d) both vertices are in the same pixel than the line may be culled. However if both vertices are not in the same pixel then the line is a multi-pixel line that does not exit the second diamond and should be pulled back to miss the center of the pixel, at 626.

At 628, if a) the line is a positive x-major line, b) the starting vertex is in the right half of a pixel, and c) the line exits the diamond, then the line should be pushed out to catch the center of the pixel.

At 630, the line may be culled if a) the line is a negative (e.g., left-going) x-major line, b) the ending vertex is in a left half of a pixel, c) the ending vertex is in the diamond but does not exit, and d) both vertices are in the same pixel. However if both vertices are not in the same pixel then the line is a multi-pixel line that does not exit the second diamond and should be pulled back to miss the center of the pixel, at 632.

At 634, if a) the line is a negative x-major line, b) the starting vertex is in the left half of a pixel, and c) the line exits the diamond, then the line should be pushed out to catch the center of the pixel.

At 636, the line may be culled if a) the line is a positive y-major line, b) the ending vertex is in a bottom half of a pixel (e.g., the ending vertex of the line will not cover the center), c) the ending vertex is in the second diamond but does not exit, and d) both vertices are in the same pixel. However if both vertices are not in the same pixel then the line is a multi-pixel line that does not exit the second diamond and should be pulled back to miss the center of the pixel, at 638.

At 640, if a) the line is a positive y-major line, b) the starting vertex is in the bottom half of a pixel, and c) the line exits the diamond, then the line should be pushed out to catch the center of the pixel.

At 642, the line may be culled if a) the line is a negative (e.g., left-going) y-major line, b) the ending vertex is in the top half of a pixel, c) the ending vertex is in the diamond but does not exit, and d) both vertices are in the same pixel. However if both vertices are not in the same pixel then the line is a multi-pixel line that does not exit the second diamond and should be pulled back to miss the center of the pixel, at 644.

At 646, if a) the line is a negative y-major line, b) the starting vertex is in the top half of a pixel, and c) the line exits the diamond, then the line should be pushed out to catch the center of the pixel. The above described method of conditioning a line may be implemented in software, hardware, firmware or a combination thereof. An exemplary set of software instructions for implementing the above described method of conditioning a line is shown in FIGS. 7A-7H.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving starting and ending vertices of a given line;
   conditioning a start of the given line or an end of the given line including
      pulling in the end if the given line is a given line type related to a given diamond test area, the end is in a given portion of a pixel, the end is in a second diamond test area but does not exit the second diamond test area and both start and end of the given line are not in a same pixel; and
      pushing out the start if the given line is the given line type, the start is in the given portion of the pixel and the given line exits a first diamond test area; and
   lighting a pixel of a display if the given line exits a diamond test area of the pixel after the conditioning.

2. The method according to claim 1, wherein the given line is a segment of a line strip.

3. The method according to claim 1, further comprising:
   determining if the given line is an x-major or y-major line from a slope of the given line;
   determining if the given line starts on a corner or edge of an appropriate x-major or y-major diamond test area;
   determining if the given line ends on a corner or edge of the appropriate diamond test area; and
   determining if the given line exits one or more diamond test areas.

4. The method according to claim 3, wherein the diamond test area comprises:
   an area enclosed by a diamond within the a given pixel, including the lower left edge of the diamond, the lower right edge of the diamond and the bottom corner of the diamond, if the given line is an x-major type line; and
   an area enclosed by the diamond, including the lower left edge of the diamond, the lower right edge of the diamond, the bottom corner of the diamond and the right corner of the diamond, if the given line is an y-major type line.

5. The method according to claim 1, wherein conditioning the start or end of the given line further comprises:
   pulling in the ending vertex of a positive x-major line if the ending vertex is in a right half of a pixel, the ending vertex is in a second diamond test area but does not exit the second diamond test area, and both vertices of the given line are not in a same pixel;
   pushing out the starting vertex of a positive x-major line if the starting vertex is in the right half of the pixel, and the given line exits a first diamond test area;
   pulling in the ending vertex of a negative x-major line if the ending vertex is in a left half of the pixel, the ending vertex is in the second diamond test area but does not exit the second diamond test area, and both vertices of the given line are not in the same pixel;
   pushing out the starting vertex of a negative x-major line if the starting vertex is in the left half of the pixel, and the given line exits the first diamond test area;
   pulling in the ending vertex of a positive y-major line, the ending vertex is in a bottom half of the pixel, the ending vertex is in the second diamond test area but does not exit the diamond test area, and both vertices of the given line are not in the same pixel;
   pushing out the starting vertex of a positive y-major line, the starting vertex is in the bottom half of the pixel, and the given line exits the first diamond test area;
   pulling in the ending vertex of a negative y-major line, the ending vertex is in a top half of the pixel, the ending vertex is in the second diamond test area but does not exit the second diamond test area, and both vertices of the given line are not in the same pixel; and pushing out the starting vertex of a negative y-major line, the starting vertex is in the top half of the pixel, and the given line exits the first diamond test area.

6. The method according to claim 5, wherein conditioning the start or end of the given line further comprises:
culling a positive x-major line if an ending vertex is in a right half of a pixel, the ending vertex is in a second diamond test area but does not exit the second diamond test area, and both vertices of the given line are in a same pixel;
culling a negative x-major line if the ending vertex is in a left half of the pixel, the ending vertex is in the second diamond test area but does not exit the second diamond test area, and both vertices of the given line are in the same pixel;
culling a positive y-major line if the ending vertex is in a bottom half of the pixel, the ending vertex is in the second diamond test area but does not exit the diamond test area, and both vertices of the given line are in the same pixel;
culling a negative y-major line if the ending vertex is in a top half of the pixel, the ending vertex is in the second diamond test area but does not exit the second diamond test area, and both vertices of the given line are in the same pixel; and
culling the given line if the given line is a short line and the given line is in the first diamond test area and the second diamond test area, wherein the given line is a short line if the corresponding coordinates of the starting and ending vertices are in the same pixel.

7. A computer-readable medium containing a plurality of instructions which when executed cause a computing device to implement a method of conditioning a line comprising:
pulling in an ending vertex of a given line if the given line is a given line type related to a given diamond test area, the ending vertex is in a given portion of a pixel, the ending vertex is in a second diamond test area but does not exit the second diamond test area and both vertices of the given line are not in a same pixel; and
pushing out a starting vertex of the given line if the given line is the given line type, the starting vertex is in the given portion of the pixel and the given line exits a first diamond test area.

8. The computer-readable medium according to claim 7, wherein pulling in the ending vertex of a given line if the given line is the given line type, the ending vertex is in the given portion of a pixel, the ending vertex is in the second diamond test area but does not exit the second diamond test area and both vertices of the given line are not in the same pixel comprises:
pulling in the ending vertex of the given line if the given line is a positive x-major line, the ending vertex is in a right half of the pixel, the ending vertex is in the second diamond test area but does not exit the second diamond test area, and both vertices of the given line are not in the same pixel;
pulling in the ending vertex of the given line if the given line is a negative x-major line, the ending vertex is in a left half of the pixel, the ending vertex is in the second diamond test area but does not exit the second diamond test area, and both vertices of the given line are not in the same pixel;
pulling in the ending vertex of the given line if the given line is a positive y-major line, the ending vertex is in a bottom half of the pixel, the ending vertex is in the second diamond test area but does not exit the diamond test area, and both vertices of the given line are not in the same pixel; and
pulling in the ending vertex of the given line if the given line is a negative y-major line, the ending vertex is in a top half of the pixel, the ending vertex is in the second diamond test area but does not exit the second diamond test area, and both vertices of the given line are not in the same pixel.

9. The computer readable-medium according to claim 8, wherein pushing out the starting vertex of the given line if the given line is the given line type, the starting vertex is in the given portion of the pixel and the given line exits the first diamond test area comprises:
pushing out the starting vertex of the given line if the given line is a positive x-major line, the starting vertex is in the right half of the pixel, and the given line exits the first diamond test area;
pushing out the starting vertex of the given line if the given line is a negative x-major line, the starting vertex is in the left half of the pixel, and the given line exits the first diamond test area;
pushing out the starting vertex of the given line if the given line is a positive y-major line, the starting vertex is in the bottom half of the pixel, and the given line exits the first diamond test area; and
pushing out the starting vertex of the given line if the given line is a negative y-major line, the starting vertex is in the top half of the pixel, and the given line exits the first diamond test area.

10. The computer readable-medium according to claim 9, further comprising culling the given line if the given line is the given line type, the ending vertex is in the given portion of the pixel, the ending vertex is in the second diamond test area but does not exit the second diamond test area and both vertices of the given line are in the same pixel.

11. The computer readable-medium according to claim 10, wherein comprising culling the given line if the given line is the given line type, the ending vertex is in the given portion of the pixel, the ending vertex is in the second diamond test area but does not exit the second diamond test area and both vertices of the given line are in the same pixel comprises:
culling the given line if the given line is a positive x-major line, the ending vertex is in a right half of the pixel, the ending vertex is in the second diamond test area but does not exit the second diamond test area, and both vertices of the given line are in the same pixel;
culling the given line if the given line is a negative x-major line, the ending vertex is in a left half of the pixel, the ending vertex is in the second diamond test area but does not exit the second diamond test area, and both vertices of the given line are in the same pixel;
culling the given line if the given line is a positive y-major line, the ending vertex is in a bottom half of the pixel, the ending vertex is in the second diamond test area but does not exit the diamond test area, and both vertices of the given line are in the same pixel; and
culling the given line if the given line is a negative y-major line, the ending vertex is in a top half of the pixel, the ending vertex is in the second diamond test area but does not exit the second diamond test area, and both vertices of the given line are in the same pixel.

12. The computer readable-medium according to claim 11, further comprising culling the given line if the given line is a short line and the given line is in the first diamond test area and the second diamond test area, wherein the given line is a short line if the corresponding coordinates of the starting and ending vertices are in the same pixel.

13. The computer readable-medium according to claim 12, further comprising:
   determining a fraction portion of each coordinate of the starting and the ending vertices of the given line;
   determining a Manhattan distance from a center of the pixel for each coordinate of the starting and the ending vertices of the given line;
   determining if the given line is the x-major or the y-major line and if positive or negative;
   determining if the given line is the short line based upon the fractional portion of the coordinates of the given line;
   determining if the line is in the first diamond and the second diamond based upon the Manhattan distances for the starting and ending vertices of the given line;
   determining if the starting and or ending vertices touch a third or a fourth quadrant of the pixel;
   determining if the starting and or ending vertices touch a point A or a point C of a given diamond test area; and
   determining if the given line is in the first diamond test area and or the second diamond test area based upon whether the starting and or ending vertices touch particular quadrants of the pixel and particular points of a given diamond test area and whether the given line is the x-major line or the y-major line.

14. The computer readable-medium according to claim 13, further comprising adjusting one or more of the coordinates of the starting and or ending vertices of the given line to a given maximum or minimum value if the one or more coordinates are outside of the maximum or minimum value.

15. The computer readable-medium according to claim 14, wherein the given line is a segment of a line strip.

16. A processor comprising:
   a setup unit for receiving a draw command and parameters describing a geometric primitive; and
   a rasterizer, communicatively coupled to the setup unit for rasterizing the geometric primitive, wherein the rasterizer includes a line condition logic for;
      pulling in an ending vertex of a given line if the given line is a given line type related to a given diamond test area, the ending vertex is in a given portion of a pixel, the ending vertex is in a second diamond test area but does not exit the second diamond test area and both vertices of the given line are not in a same pixel; and
      pushing out a starting vertex of the given line if the given line is the given line type, the starting vertex is in the given portion of the pixel and the given line exits a first diamond test area; and
   a data write unit, communicatively coupled to the rasterizer, for outputting the resulting pixel data.

17. The processor of claim 16, wherein the rasterizer is further adapted for:
   culling the given line if the given line is the given line type, the ending vertex is in the given portion of the pixel, the ending vertex is in the second diamond test area but does not exit the second diamond test area and both vertices of the given line are in the same pixel; and
   culling the given line if the given line is a short line and the given line is in the first diamond test area and the second diamond test area, wherein the given line is a short line if the corresponding coordinates of the starting and ending vertices are in the same pixel.

18. The processor of claim 16, wherein the geometric primitive comprises the starting vertex and ending vertex of the given line.

19. The processor of claim 16, wherein the processor is a general purpose central processing unit (CPU).

20. The processor of claim 16, wherein the processor is a graphics processing unit (GPU).

* * * * *